No. 878,170. PATENTED FEB. 4, 1908.
F. R. WILLSON, Jr.
CONVEYER.
APPLICATION FILED MAR. 28, 1905.
2 SHEETS—SHEET 1.
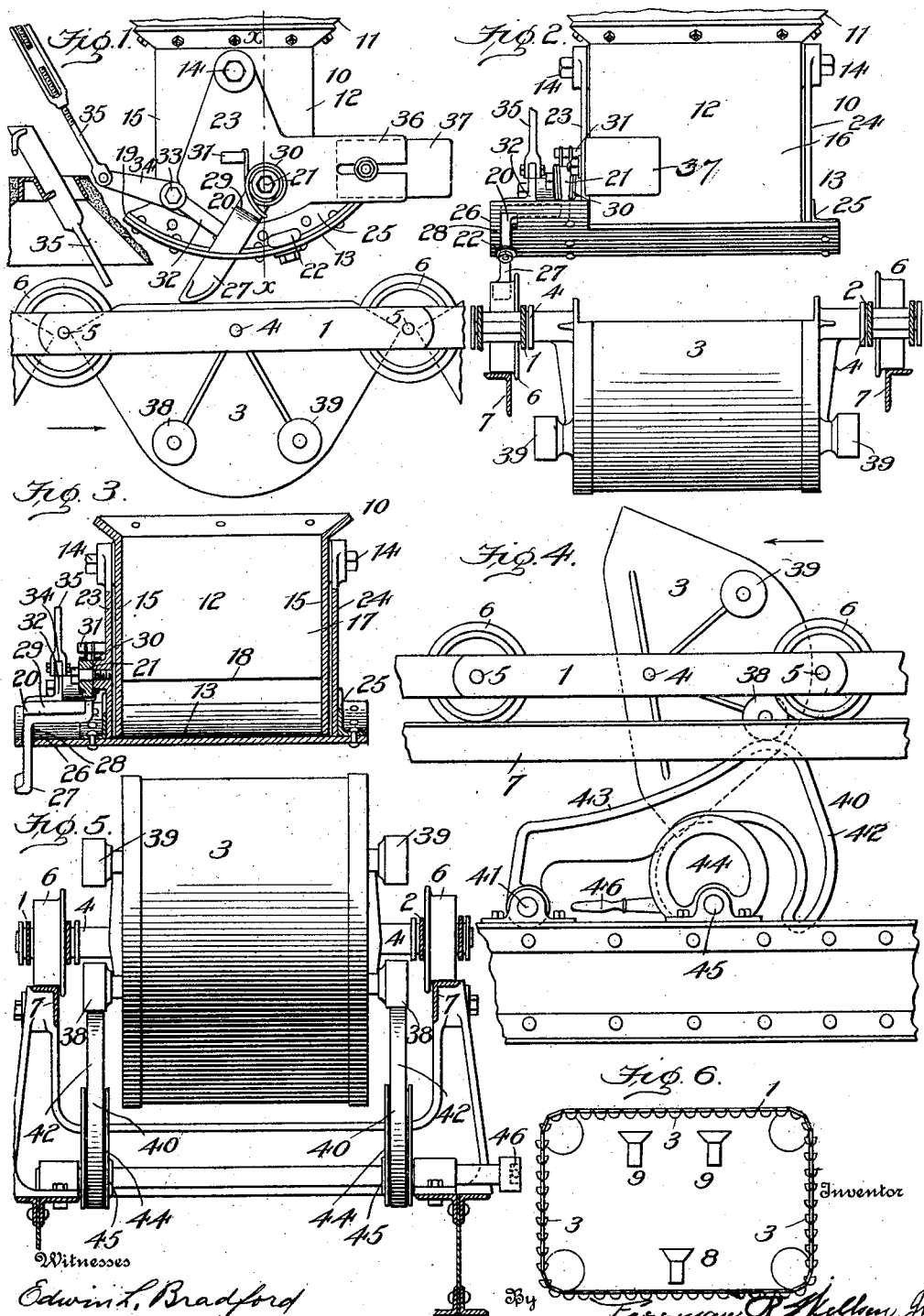

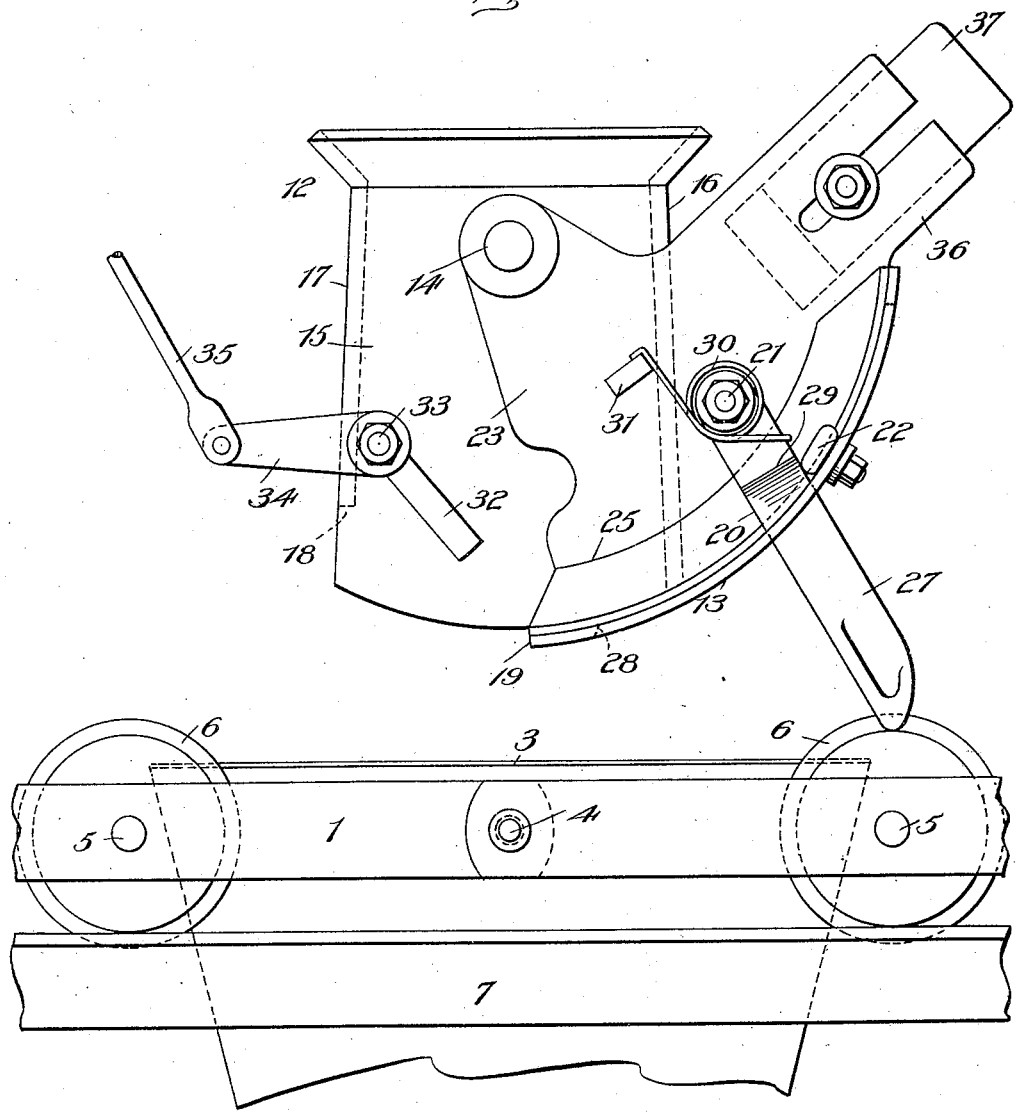

UNITED STATES PATENT OFFICE.

FREEMAN R. WILLSON, JR., OF WORTHINGTON, OHIO, ASSIGNOR, BY MESNE ASSIGNMENTS, TO THE JEFFREY MANUFACTURING COMPANY, A CORPORATION OF OHIO.

CONVEYER.

No. 878,170.     Specification of Letters Patent.     Patented Feb. 4, 1908.

Application filed March 28, 1905. Serial No. 252,573.

*To all whom it may concern:*

Be it known that I, FREEMAN R. WILLSON, Jr., citizen of the United States, residing at Worthington, in the county of Franklin and State of Ohio, have invented certain new and useful Improvements in Conveyers, of which the following is a specification, reference being had therein to the accompanying drawing.

This invention relates to improvements in carrying and conveying apparatus, of the class in which use is made of endless chains with what are termed "swinging" buckets pivotally suspended therein, it pertaining more particularly to devices for delivering to the buckets successively the loads which they are carrying, and to the devices by which they are subsequently tilted or turned upon their hinges for the purpose of discharging the contents. Much trouble has been experienced in using conveying systems of this class, because of the difficulty in delivering to the buckets their loads or charges in such way that there shall be no spilling of the material between them. To overcome this difficulty, use has generally been made of lips, flanges or aprons or the like at the front and rear edges of the buckets, adapted to successively overlap one the next, these lips or flanges being so arranged as to catch material from the hopper or chute that delivers the load and prevent its spilling between the buckets. But these very devices, the overlapping flanges or lips, in their turn introduce into the structure matters of difficulty in the operation of the apparatus, as the buckets must be tilted or turned at two or three places in their transit in order to get them into their correct relative positions, each to the next, to permit them to travel without undue interference with each other. Attempts have been made to obviate both these sets of difficulties (one incident to the loading of the buckets, with an avoidance of spilling; and the other incident to having the buckets properly related if they be provided with overlapping lips or flanges) by means of intermittingly acting loading devices connected with the hopper or chute which delivers the material. Such loaders or chargers obviate the necessity of the overlapping lips or guards at the edges of the buckets, but to them in turn, as heretofore made, there has been incident another difficulty equally serious. Sometimes this loading apparatus has been of the character of a revolving measuring device situated at the bottom of a hopper, having a shaft with radial walls and end walls forming pockets or receptacles which first receive a load from the mass of superincumbent material in the hopper, and then intermittingly take a step forward and dump or deliver the material to a bucket passing beneath. In other cases, use has been made of a plain swinging damper valve; that is, a valve mounted on a horizontal recess at the bottom of the hopper or chute and arranged to tightly close the same until it is intermittingly allowed to descend to permit the drop of a load after which it is again brought back to tightly close the chute. With all these earlier mechanisms, there has been a liability to catch a large particle or mass of material between the wall of the hopper and the valve or closing device just as it was moving toward its closing position; and if it be moved by a positively acting mechanism, breakage is the necessary and invariable result. It will be borne in mind that these carriers or conveyers are principally used for transporting bituminous coal from one point to another, as in large boiler rooms and similar places, this coal generally being of the sort known as "run of mine"; that is to say, coal in a miscellaneous mass containing not only masses of slack or finely reduced coal, but blocks of various sizes not reduced and frequently including even very large lumps. It is these large lumps and the uncertainty of their presence in the stream of material as it descends that prevents the use of the hopper-closing and opening devices above referred to.

The loading apparatus which I have devised consists of a rocking valve or damper arranged to move entirely across the normal lines of descent of the material as it passes downward from a chute or hopper, and to continue moving in a horizontal line considerably beyond the said vertical lines of descent before it comes to rest, together with a chute the bottom wall of which is so shaped as to give clearance or easement for any lumps or blocks of material that may be at such points that they are just about to escape, but are arrested by the valve or damper as it closes, the clearance referred to insuring that there shall be no breakage of any of the parts.

The invention also relates to means for unloading the buckets, which will be fully understood from the drawings and the description given below.

Figure 1 shows in side elevation part of a conveyer, and the loading device used in conjunction therewith. Fig. 2 is a cross section of the conveyer, and presenting an end view of the hopper-chute and loader. Fig. 3 is a vertical section on the line $x$—$x$ of Fig. 1. Fig. 4 is a side view of a part of the conveyer, and of the bucket-tilting or emptying mechanism. Fig. 5 is a cross section of the conveyer, showing its parts and the bucket-tilting mechanism in the positions illustrated in Fig. 4. Fig. 6 is a diagrammatic view illustrating in side elevation a conveyer of the sort in which my improvements can be embodied. Fig. 7 is a side elevation of a portion of a conveyer and the loading device, the latter being in the position occupied when delivering to one of the buckets of the conveyer.

In the drawings, a conveyer is shown having two parallel chains 1, 2, each built up of articulated links.

3, 3, indicate the buckets; each is supported by a pivoting device at 4 in the chains 1, 2.

6, 6, indicate wheels or supporting rollers which carry the chain links and buckets, being interposed between them and a track at 7. These wheels or rollers are mounted on axes at 5 preferably the pintles which connect the chain links each to the next. The conveyer travels from a loading point 8 where there is delivered to the bucket the material which is to be transported; and 9, 9, indicate the discharging places where the buckets are tilted to empty their contents.

At the place for delivering the material to the buckets, there is arranged a holder which is indicated as a whole by 10. The material is initially held in a hopper part of which is indicated at 11, and from which it passes downward through a chute 12.

13 is a curved valve or cut-off mounted at and suspended from the axis at 14.

The chute 12 has two side walls 15, 15, a front wall 16, and a rear wall 17. These walls are so constructed as that the valve or cut-off 13 shall move comparatively close to the bottom edges of the walls 15, 15. But the rear wall 17 is made considerably shorter vertically, so as to leave a large permanently open passageway 18.

The conveyer travels in the direction of the arrow shown in Fig. 1, and as each conveyer element approaches the hopper and chute, the valve or cut-off 13 is caused to move forward. As it does so, its rear edge moves gradually out from under the material in the chute 12 and a quantity thereof is permitted to drop into the bucket 3 which is below it. Immediately after the desired quantity has fallen, the valve or cut-off returns to its closed position, shown in Fig. 1, and in doing so, moves across more or less of the stream of descending material and cuts it off, the valve gradually becoming a support upon which rests the mass that does not drop. The edge 19, as shown in Fig. 1, moves to a line well beyond the vertical lines of the chute, and thus completely cuts off the material. The permanently open passageway at 18 between the bottom edge of the rear wall 17 and the valve or chute insures that if any large particles, blocks or lumps should be in positions near the bottom edge of this wall 17, they will not effect locking or binding of the valve or cut-off. They can even roll up some distance with it, as it finishes the last part of its movement. The distance to which this edge 19 of the valve is carried is such that while material can squeeze out to some extent through the opening at 18, it will not rise high enough to spill over this edge 19.

The movements of the valve or cut-off are effected as follows. 20 is a trip arm pivoted at 21 and having its lower end so disposed as to normally lie in the path of the rollers 6 as they move under the chute. Each roller, as it approaches, first engages with this arm and rocks it a limited distance without any action on the valve, but when the arm reaches a stop at 22, the valve is put in motion and swings forward, with the results above described. 23, 24, are radius bars or plates connected to the valve or cut-off at the bottom and extending up to the hinges 14, they providing a rocking support for the valve. To the plate 23 is pivoted the trip arm 20. The valve 13 is secured to the plates by means of curved angle irons 25 riveted to the vertical plates and also to the valve. The latter is formed of a concavo-convex piece of metal which extends on one side to a distance beyond the chute, as shown at 26. The arm 20 has the downward extending leg 27 which passes through the slot 28 in this extension 26 of the valve plate, and at 29 is turned inward and then upward to the hinging point at 21. 30 is a spring interposed between a lug 31 on the radius plate 23 and the heel part of the trip arm 20; and this spring normally tends to hold the trip arm in its rearmost position; that is to say, away from the stop at 22. When a wheel 6 impinges on the arm 20, it moves it against the action of the spring 30 until it is arrested as aforesaid by the stop 22. Normally, however, the arm 20 cannot move under the action of the spring 30 to its rearmost position, there being an adjustable stop 32 which prevents it. This stop is of the nature of a swinging arm pivoted at 33 to the side wall 15 of the chute. The stop is so adjusted that, at will, it can hold the arm 20 in proper place to be struck by the wheels 6 successively. But if the stop be thrown upward so as to be out of the path of the arm 20, the latter will, under the action of the spring 30, move rearward to a still greater distance from that shown in full lines in Fig. 1, and its lower end will swing up so high that the rollers 6 will pass under it and not engage with it. The stop 32 can at will be moved into and out of its operative position by devices such as shown.

34 is an arm connected to the stop arm and also pivoted at 33.

35 is an operating rod of any suitable length, it being illustrated in Fig. 1 in two sections, one part shown being the lower end, and the other part being the upper. It is pivoted to the arm 34 and extends to a suitable place to be accessible to an operator, as for instance to a floor below the loader. By means of these devices, the operator can cause the arm 20 under the action of spring 30 to lie in a position where at each passage of the bucket, the valve will be opened, and a load dropped, or in a position where it will be inactive in order that the valve may remain closed and the buckets pass without receiving material.

By arranging the trip arm at one side of the valve or cutoff and in position to be operated by one of the endless conveyers or a projection carried thereby, I am enabled to bring the mouth of the spout or chute 12 very close to the top of the buckets carried by the endless conveyers, and this is further permitted by reason of the fact that the plate that constitutes the valve or cutoff lies close to and moves concentric with the end of the spout or chute. This construction and arrangement reduces the shocks and jars incident to the loading of the buckets and, by reason of the proximity of the loading and loaded parts permits a more rapid operation of the conveyer than would be possible were they situated farther apart.

The plate 23 is extended back, as shown at 36, and the extension is formed in such way as to have an adjustable weight 37 secured thereto. This weight acts to bring the valve to its closed position, and will cause a rearward movement thereof until it is arrested by the devices adjacent to the hinges 33 which serve as a stop.

The valve device or cut-off for the chute 12, such as shown in the accompanying drawings and described herein, has the following characteristics. The plate 13 thereof is longer than the cross-dimension of the chute, so that at least one—the rear—edge thereof projects beyond the plane of the rear wall 17 when the valve is in closing or cutting-off position. Again, the chute has a clearance opening or space, designated 18, in one of its walls—the one toward the rear edge of the cut-off plate,—so that, as already described, the material passing through the chute may adjust itself during the closing movements of the valve without interfering with the latter; and thirdly, the cut-off plate 13 is concave toward the chute, so that it will receive and retain any particles of the material passing through the chute that may escape through the opening 18.

There may be as many of these loading devices arranged along the bottom run of the conveyer as are found desirable. When one is in action, the others can have their arms 20 in their inactive position.

The means for tilting the buckets and unloading them are shown in Figs. 4 and 5. There may be several sets of these dumping mechanisms located in series along the upper run of the conveyer. Each bucket is provided on each end with projections at 38, 39, which are part of the set of devices for effecting the dumping and returning of the buckets. Preferably these are lugs provided with anti-friction rollers.

40 is a dumping cam. It is pivoted at 41 to the framework below the track 7 of the upper run. It is formed with a sharply inclined edge 42 and a more gradually inclined edge at 43.

44 is a rocking cam mounted in the frame at 45 and provided with a lever 46 for rocking the dumping cam into and out of its operative position. As each loaded bucket approaches the dumping cam, its projections or rollers at 38 engage with the sharply inclined edge at 42 and the bucket is somewhat rapidly turned upon its axis at 4 and caused to discharge its contents. As it advances, its cam projections or rollers 38 pass over the high points of the dumping cam, and begin to descend along the more gradually inclined part 43, and the bucket is allowed to right itself. Before the parts at 38 escape from the cam edge at 43, the projections or rollers at 39 engage with the top part of the dumping cam and hold the bucket steady until they escape, at which instant the bucket has been brought back to its normal level position.

What I claim is:

1. In a loader for a conveyer, the combination with a chute, a pair of endless chains and a series of conveyer elements carried by the chains and arranged to travel beneath the chute and to receive material therefrom, of a valve arranged to normally cut off the flow of material through said chute and adapted to be swung bodily around a fixed axis to permit the flow of material from the said chute the length of the valve being greater than the cross-dimension of the chute, and means connected with the valve engaging with and operated by one of the said chains for moving the valve to permit delivery of material to the said conveyer elements.

2. In a loader for a conveyer, the combination with a series of buckets to be loaded and endless chains to which the buckets are pivoted, of a chute through which material is delivered to the buckets, a pivoted valve arranged to normally cut off the flow of material through the chute, and a trip arm connected with the valve and arranged to extend into the path of the carrying chains for the buckets and to be operated thereby to move the valve in one direction, substantially as set forth.

3. In a loader for a conveyer, the combination of a chute through which material is delivered, an endless conveyer comprising a pair of carrying chains and a series of buckets pivoted thereto and arranged to move while in a normal swinging condition close to the delivery end of the chute, a valve arranged to cover the end of the chute and to cut off the flow of material through it, means for moving the valve to open the chute arranged to be operated by one of the said carrying chains, substantially as set forth.

4. In a conveyer, the combination with a series of conveyer elements, of a chute arranged above said elements and adapted to deliver material thereto, and having side walls with curved bottom edges a valve interposed between said conveyer and said chute and adapted to control the flow of the material from the chute, and comprising a curvilinear plate having its concave surface arranged to move in close proximity to the curved edges of the side walls and to normally support the material in the chute, and means operated directly by the moving conveyer for swinging said plate in the arc of a circle to permit the flow of material from the chute.

5. In a conveyer, the combination with a series of conveyer elements and a chute adapted to deliver material thereto, of a valve pivotally mounted in position and arranged to check the flow of material from the said chute, and the trip arm pivotally connected to said valve and normally held yieldingly relatively thereto and a stop on the valve adapted to be engaged by said trip arm to swing the valve around the axis of its pivotal connection.

6. A loader for a conveyer comprising a chute, a valve pivotally mounted in position and arranged to control the flow of material from said chute, a trip arm pivotally connected to said valve and adapted to be engaged by moving parts of the conveyer, and a stop on the valve adapted to be engaged by said trip arm in order to swing said valve about the axis of its pivotal mounting.

7. A loader for a conveyer comprising a chute, a swingable valve arranged to control the flow of material from said chute, a trip arm pivotally connected to said valve and adapted to be actuated by moving parts of the conveyer, a stop on said valve arranged in the path of said trip arm, and a spring tending normally to hold said trip arm out of engagement with said stop.

8. The loader for a conveyer comprising a chute, a valve arranged to control the flow of material from said chute, and having a stop, a trip arm pivotally connected to said valve and arranged to engage the said stop to actuate the valve in one direction, a spring tending normally to hold the said trip arm out of engagement with said stop on the valve, and a stop for limiting the action of said spring.

9. A loader for a conveyer comprising a chute, a valve arranged to control the flow of material from the said chute and having a stop, a trip arm pivotally connected with said valve and arranged when in its forward position to engage said stop and to actuate the valve in one direction, a spring tending normally to swing the said trip away from said stop arm and an adjustable stop for limiting the rearward movement of said trip arm.

10. A loader for a conveyer comprising a chute having an opening 18 in one end wall at the bottom thereof, a curvilinear plate arranged beneath said chute, adapted to control the flow of material therethrough and mounted to swing about a fixed axis to open and close the passage-way through the chute at its end having the wall with the opening at the bottom thereof, and means for actuating said plate.

11. A loader for a conveyer comprising a chute having an opening 18 in one end wall at the bottom thereof, a curvilinear plate arranged beneath said chute, adapted to control the flow of material therethrough and pivoted to swing about the axis from which its curve is described to open and close the passageway through the chute at its end having the wall with the opening at the bottom thereof, and means for actuating said plate.

In testimony whereof I affix my signature, in presence of two witnesses.

FREEMAN R. WILLSON, Jr.

Witnesses:
J. WEBSTER,
R. A. MCMULLIN.